Nov. 13, 1951     A. BECHLER     2,574,775
AUTOMATIC LATHE HEADSTOCK RECIPROCATING MEANS

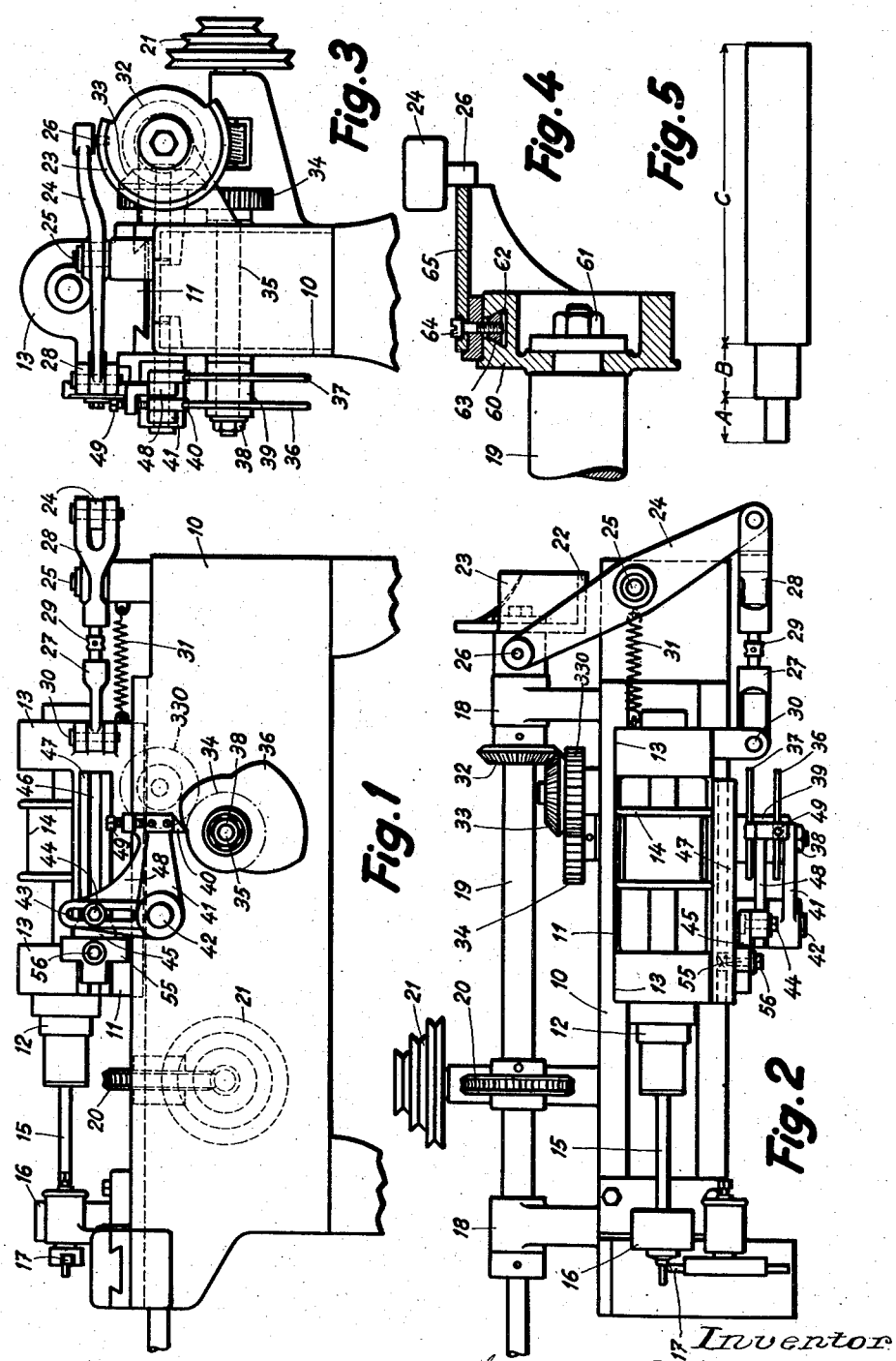

Filed Sept. 24, 1945     2 SHEETS—SHEET 2

Inventor
A. Bechler

Patented Nov. 13, 1951

2,574,775

UNITED STATES PATENT OFFICE 2,574,775

AUTOMATIC LATHE HEADSTOCK RECIPROCATING MEANS

André Bechler, Moutier, Switzerland

Application September 24, 1945, Serial No. 618,111
In Switzerland July 21, 1945

8 Claims. (Cl. 74—53)

In automatic lathes with an axially movable headstock the movement of the latter is utilized to feed the stock (backward movement to select the necessary length of bar material forming the next workpiece), to turn with fixed cutting tools performing cylindrical operations, or with movable tools for taper turning, and in some cases, to change the position of the form tools.

The movement of the movable headstock which is proportional to the length of the work, was effected in prior constructions either by bell-shaped or by cam discs. The latter are easier to make but have disproportionally large dimensions with respect to the machine as soon as the work is of a certain length.

The present invention relates to a method of profiting by the advantages of both types of cams and avoiding the necessity of manufacturing complicated cams by equipping the machine in such a manner as to permit the axially movable headstock to be moved alternately during each cycle of the machine by a bell-shaped cam and at least one cam disc.

This method of proceeding also permits the use of standard cams whose lobes may work one after another in any desired sequence.

In preference, the cams are distributed on two shafts, one at right angles to the other, one being parallel to the axis of the headstock and carrying, e. g. a bell-shaped cam or a drum allowing parts replacing the lobes to be fixed thereto, the other cam shaft being perpendicular to the said headstock and equipped with cam disc serving preferably in operations requiring small feed paths, whereas the bell-shaped or cylindrical cams are used in the case of larger feed paths of the work. Depending on the nature of the work both types of cams are used alternately, necessary precautions being taken to avoid conflict between the feed paths of the headstock produced by the different cams.

The accompanying drawing represents, by way of example, an embodiment of the lathe according to the invention. The drawing is simplified so as to illustrate more easily the points of interest. The tools and tool mechanism are not shown. They can be chosen according to the case both in number and kind.

Fig. 1 is a side elevation of the lathe in question;

Fig. 2, a plan view;

Fig. 3, an end elevation;

Fig. 4 shows in detail and on a larger scale a special embodiment of a bell-shaped cam and Fig. 5 is a diagrammatical sketch of the work to be produced.

Figure 6:
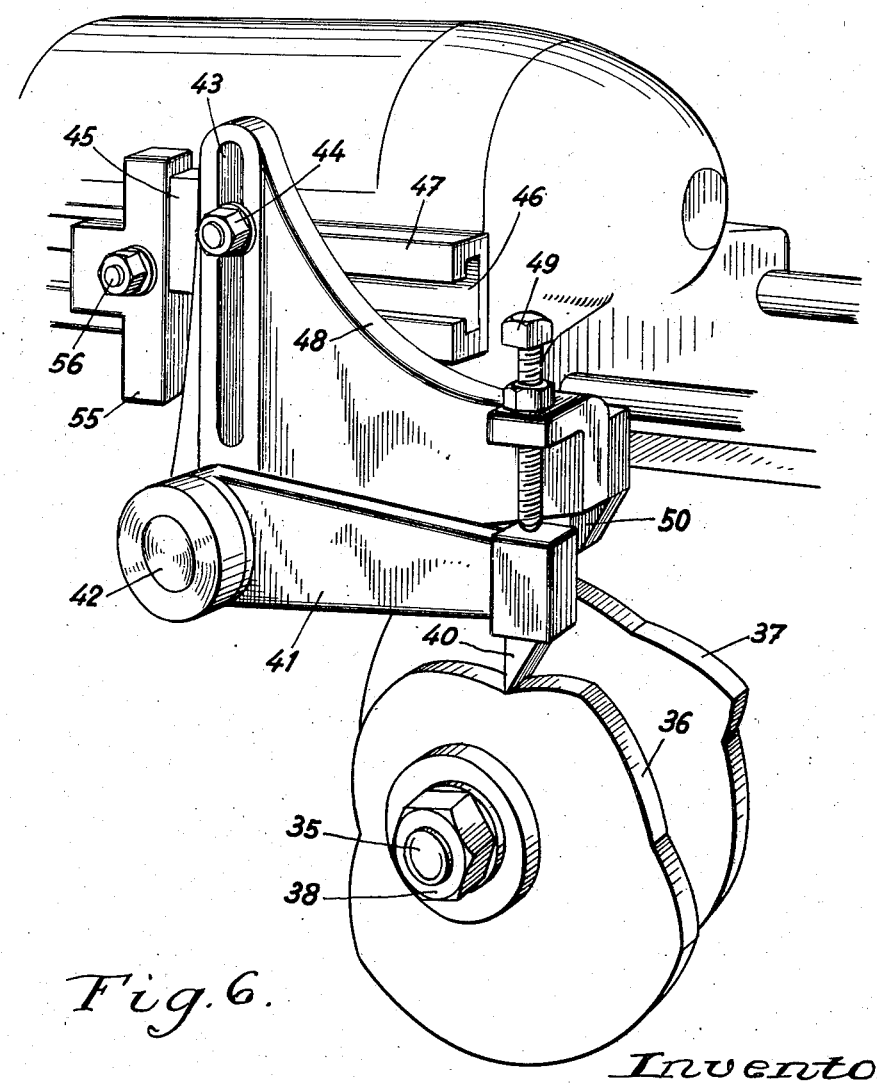
Fig. 6 is an enlarged detail view of the cam disc mechanism.

In the embodiment illustrated the machine tool includes a headstock incorporating a slide 11 movable along guideways on the bed 10. Bearings 13 embodied with the slide of the headstock journal the axle 12 thereof which is driven by a pulley wheel 14. The bar stock 15, or the work, is fixed to the spindle 12 in some known manner not illustrated and is moreover supported at its free end in a fixed stay 16 near the tool 17 operated by some suitable mechanism not described. On one side of the lathe bed two bearings 18 carry a cam shaft 19 driven by a worm gear 20 and cone pulley 21. The shaft 19 carries at one of its ends a bell-shaped cam 22 whose lobes 23 act on a lever 24 pivoted at 25 to the machine bed and having at one of its extremities a follower 26 which comes into contact with the lobes 23 under the indirect influence of a spring 31, as will be shown later on. This spring 31 is fixed to the headstock 11 and to the machine bed 10. The lever 24 is fixed at its other extremity by means of an articulated joint to an adjustable connecting rod formed by the two parts 27 and 28 and the adjusting screw 29. The pin 30 serves as an articulated joint between an arm integral with the headstock, the headstock arm and the rod 27. The spring 31 exerts a traction on the headstock towards the right in Fig. 2 and, in consequence, the headstock through the intermediary of the rod 27, 28 tries to turn the lever 24 in an anticlockwise direction.

The first cam shaft 19 also carries a bevel wheel 32 engaging in a second bevel wheel 33 driving an intermediate gear 330 in mesh with a gear wheel 34 mounted on the cam shaft 35 passing through the bed of the lathe perpendicularly to the first cam shaft 19. At the other extremity of the cam shaft 35 are mounted two cam discs 36 and 37 which are bolted to the said shaft with the nut 38 and maintained apart by means of a collar 39.

The follower 50, forming the extremity of the bell crank 48 which is pivoted on the machine bed at 42 rides on the cam 37. The other end of the bell crank is provided with a slot 43 in which the bolt 44 can be adjusted and on which a shoe 45 is mounted oscillatingly. The shoe bears against a stop 55 adjustable along a guideway 47 of the headstock. The initial position of the shoe is determined by that of the stop 55 which can be fixed by means of the nut 56.

A second arm 41 pivoted independently on the same axle 42 as the bell crank 48 bears on the cam 36 by means of a follower 40 a similar follower 50 of the bell crank 48 and the cam 37. A screw projecting laterally to the lever system provided in the upper part of the follower of the bell crank is disposed to cooperate with the follower of the loose arm 41.

The purpose of this arrangement of levers, which is in no direct relation with the spirit of the invention is as follows:

It is true that the parts A and B of the workpiece shown in Fig. 5 might be machined with the aid of one single cam. However it often happens that, e. g., the length B should be altered while leaving the length A unchanged. In this case the arrangement of two cams is very advantageous. The length A is then machined by the one cam, say 37, and the other by the second cam 36. The influence of the cam 36 upon the bell crank 48 may be varied by adjusting the screw 49. If this screw 49 is, for instance, adjusted deeper, the arm 41, on the follower 40 moving along an ascent of the disc 36, will contact the screw 49 earlier, and the stroke of the headstock and the length B will, in consequence, become longer. If, on the contrary, the screw 49 is unscrewed, the arm 41 will contact the screw 49 later and the stroke of the headstock and the length B become shorter. With both adjustments, however, the length A remains unchanged.

Suppose, for example, that the work represented diagrammatically in Fig. 5 has to be turned, it would be necessary to use a cam disc determining a displacement of the headstock in the case of the comparatively narrow shoulders A and B, whereas a bell-shaped cam would be more suitable in the case of the longer length of turning C.

The initial position of operation is represented in Fig. 2. The lobes of the cam 36 will lift in their turn the followers 40 thus causing the arm 41 to oscillate and to turn by means of the screw 49 the arm 48 pushing the headstock twice against the action of the spring 31. These movements will have brought the follower 26 of the lever 24 into the field of action of the lobe 23 of the cam 22 which is cut out at the periphery so as to let the follower pass. The above mentioned lobe actuates in its turn the lever 24 and causes the headstock to move forward. This displacement takes place quite independently of the position of the shoe which slides in the guideway 46, whereas the stop 45 moves with the headstock.

Fig. 4 shows, on a larger scale, how the bell-shaped cam at the end of the shaft 19 can be arranged. It comprises a hollowed out cylindrical part 60 which can be fixed to the end of the shaft 19 by means of a nut 61. This part is provided with a trapezoid shaped nut 63 with bolt 64 with the aid of which lobes 65 can be bolted on to the circumference of the cylindrical part. The lobes are made by cutting away a part of the wall of a small hollow length of cylinder. Such lobes may be standardized and used in the case of different pieces of work by proper adjustment on the hollowed out wheel. In other cases the lobes can be suitably changed. It is therefore clear that I have provided in a machine tool a bed having a longitudinally disposed guideway therein and a slide movable along said guideway, means for moving the slide including a first cam means including at least one cam disc, a follower therefore, a second cam means including a bell-shaped cam and follower means for said bell-shaped cam, common drive means for simultaneously rotating both cams, connecting means extending between said first follower and the slide whereby the cam disc means initially moves the slide, the second follower means including movable means operably connected to and movable with the slide and to dispose said second follower in cooperative driving relationship with respect to the bell-shaped cam responsive to the movement of the slide occasioned by the first cam means whereby the slide is moved initially by the first-mentioned cam means during the initial period of the cycle of operation of the common drive means and by the bell-shaped cam means during the subsequent period of the cycle of operation of the common drive means.

What I claim is:

1. In a machine tool having a slide longitudinally movable on a slideway, cam disc means, first follower means for the cam disc means, bell-shaped cam means, second follower means for the bell-shaped cam means, common drive means for said cam disc means and said bell-shaped cam means, and connecting means respectively between the first and second follower means and the slide whereby the slide is moved by said cam disc means during one period of a cycle of operation of the common drive means and by the bell-shaped cam means during another period of the cycle of operation of the common drive means.

2. In a machine tool including a bed having a longitudinally disposed guideway therein, a slide movable along said guideway, means for moving the slide including a first cam means including at least one cam disc, a follower therefor, a second cam means including a bell-shaped cam, follower means for said bell-shaped cam, common drive means for simultaneously rotating both said cams, connecting means extending between said first follower and said slide whereby said cam disc means initially moves said slide, said second follower means including movable means operably connected to and movable with the slide and to dispose said second follower in cooperative driving relationship with respect to said bell-shaped cam responsive to movement of said slide occasioned by said first cam means whereby the slide is moved initially by said first-mentioned cam means during the initial period of the cycle of operation of the common drive means and by the bell-shaped cam means during the subsequent period of the cycle of operation of the common drive means.

3. In a machine tool as claimed in claim 2, in which both said follower means are adjustably connected with said slide to vary the increment of movement imparted by the respective cam means.

4. In a machine tool as claimed in claim 2, in which the axis of rotation of said cam disc means is transverse with respect to the direction of movement of said slide and the axis of rotation of said bell-shaped cam is parallel with respect to the direction of movement of said slide.

5. In a machine tool as claimed in claim 4, in which both said followers include pivotally mounted levers, and means adjustably connecting the levers with the slide to vary the effective lever arm length of the first-mentioned lever and the time of contact between the second follower with the bell-shaped cam responsive to the movement of the slide effected by movement of the first-mentioned lever.

6. In a machine tool having a longitudinally movable slide, a guideway for the slide, an adjustable stop movable along said slide in a direction parallel with the direction of movement of the slide, cam disc means mounted for rotation about an axis at right angles to the direction of movement of the slide, first follower means including a bell crank, one end of said bell crank being disposed for engagement with said cam disc means, the other end of the bell crank being provided with a pivotally mounted shoe for engagement with the adjustable stop to move the slide in one direction, bell-shaped cam means mounted for rotation about an axis parallel with the direction of movement of the slide, common drive means for said cam disc means and said bell-shaped cam means, and second follower means connected to the slide for engagement with the bell-shaped cam means to move the slide, said second follower means including a longitudinally adjustable member, all for the purpose of enabling the cam disc means to move the slide during one period of a cycle of operation of the common drive means and the bell-shaped cam means to move the slide during another portion of the cycle of operation of the common drive means.

7. Apparatus as defined in claim 6, wherein said second follower means includes a pivotally mounted lever and said bell-shaped cam means includes a cam surface disposed on one side of a rotatable member, one end of said lever being positioned on the other side of the rotatable member during said one period of operation and movable to the one side of the rotatable member for engagement with said cam surface during said another portion of the cycle of operation, a portion of said rotatable member being cut away to allow said movement of the lever.

8. Apparatus as defined in claim 6, wherein said bell-shaped cam means includes a rotatable member having a circumferentially disposed groove, a cylindrical segment having a cam surface extending axially of its length, and adjustable fastening means for the cylindrical segment coacting with said circumferential groove.

ANDRE BECHLER.

REFERENCES CITED

The following references are of record in the file of this patent:

UNITED STATES PATENTS

| Number | Name | Date |
|---|---|---|
| 1,952,966 | Bechler | Mar. 27, 1934 |
| 2,265,265 | Castelli | Dec. 9, 1941 |
| 2,339,140 | Boillat | Jan. 11, 1944 |

FOREIGN PATENTS

| Number | Country | Date |
|---|---|---|
| 125,532 | Switzerland | Apr. 16, 1928 |
| 218,146 | Switzerland | Mar. 16, 1942 |